(12) United States Patent
Liang et al.

(10) Patent No.: US 11,574,650 B1
(45) Date of Patent: Feb. 7, 2023

(54) GAIN SCHEDULED CONTROLLER TO HANDLE UNPREDICTABLE DISTURBANCES DURING SPIRAL WRITE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Jiangang Liang, Saratoga, CA (US); Zhi Wang, Palo Alto, CA (US)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/686,145

(22) Filed: Mar. 3, 2022

(51) Int. Cl.
*G11B 5/596* (2006.01)
*G11B 20/10* (2006.01)
*G11B 5/588* (2006.01)

(52) U.S. Cl.
CPC .......... *G11B 5/59666* (2013.01); *G11B 5/588* (2013.01); *G11B 5/59661* (2013.01); *G11B 20/10388* (2013.01)

(58) Field of Classification Search
None
See application file for complete search history.

(56) References Cited

U.S. PATENT DOCUMENTS

| | | | |
|---|---|---|---|
| 6,937,420 B1 * | 8/2005 | McNab | G11B 5/59666 360/75 |
| 7,136,253 B1 * | 11/2006 | Liikanen | G11B 5/59688 360/77.11 |
| 7,193,797 B1 * | 3/2007 | Sun | G11B 27/36 |
| 7,230,786 B1 * | 6/2007 | Ray | G11B 5/59611 |
| 7,433,143 B1 * | 10/2008 | Ying | G11B 5/012 360/48 |
| 7,619,846 B2 * | 11/2009 | Shepherd | G11B 5/59644 360/75 |
| 7,643,239 B2 | 1/2010 | Sun et al. | |
| 8,169,735 B1 | 5/2012 | Sutardja et al. | |
| 9,865,290 B1 * | 1/2018 | Liang | G11B 5/024 |
| 10,366,718 B1 * | 7/2019 | Supino | G11B 5/59627 |
| 2001/0041062 A1 * | 11/2001 | Ottesen | H04N 21/4312 348/E7.071 |
| 2007/0297087 A1 | 12/2007 | Sun et al. | |

* cited by examiner

*Primary Examiner* — Peter Vincent Agustin
(74) *Attorney, Agent, or Firm* — Kim & Stewart LLP (57) ABSTRACT

A method for writing servo information in a disk drive that includes a write head and one or more recording surfaces includes: writing a first portion of a first spiral with the write head on a first recording surface of the one or more recording surfaces while controlling a radial position of the write head with a controller that is configured with a first set of controller parameter values; after the read head crosses a second spiral formed on a second recording surface of the one or more recording surfaces, determining a radial position error for the write head based on information associated with the second spiral; and in response to the radial position error exceeding a disturbance threshold value, writing a second portion of the first spiral with the write head while controlling the radial position of the write head with the controller while the controller is configured with a second set of controller parameter values.

20 Claims, 7 Drawing Sheets

GAIN SCHEDULED CONTROLLER TO HANDLE UNPREDICTABLE DISTURBANCES DURING SPIRAL WRITE

BACKGROUND

In a typical hard disk drive (HDD), servo sectors on the disk are used to provide position information about the location of a magnetic head over a disk surface. A common approach for writing such servo information on one or more disk surfaces in an HDD is referred to as spiral-based self-servo writing, or spiral-based SSW. According to this approach, multiple spiral-shaped servo information patterns (or "servo spirals") are written on at least one disk surface prior to the SSW process. During the SSW process, a magnetic head of the HDD is positioned relative to a disk surface based on timing and position information in the servo spirals, so that the final servo information (the servo sectors) can be written on the disk surface by the magnetic head.

For an error-free and robust SSW process, the servo spirals used should be precisely written on the disk surface with a predetermined and constant slope. Such servo spirals may be written on the disk surface with an external media writer before assembly of the disk drive, or with a servo writing machine that uses an external precision actuator to position the disk drive actuator with a mechanical push pin through an opening in the disk drive housing. In either case, setup and use of such external equipment for each individual HDD is time-consuming and expensive in the context of high-volume manufacturing.

In light of this, in-drive spiral-writing schemes have been employed, in which an HDD itself writes servo spirals prior to performing the SSW process, in a so-called "blank disk spiral write" process. For example, a set of coarsely positioned spirals may be written by the HDD while the actuator is moved across a disk surface by applying a suitable open-loop voltage profile, or by using velocity control that is based on back electromotive force (back-EMF) feedback. More precisely positioned sets of spirals can then be written in one or more subsequent closed-loop spiral-writing processes, by demodulating signals from the more coarsely positioned sets of spirals. For example, a set of coarse servo spirals, a set of fine servo spirals, and a set of final servo spirals may be progressively written by the HDD itself in this way. The servo sectors are then written on a disk surface by positioning the magnetic head based on the final, most accurately positioned set of servo spirals in a spiral-based SSW process.

In a blank disk spiral write process, spirals are typically written by controlling a disk drive actuator at a constant linear velocity while the disk rotates at constant angular velocity. Therefore, the relative velocity between the magnetic read/write head and a disk surface includes both linear and angular components. As a result, the spirals written on the disk surface are substantially parallel to each other. During either track following or seeking, a servo system of the disk drive measures spiral position and timing whenever the read element of the read/write head crosses the spiral.

During a blank disk spiral write process, it is important to maintain constant linear velocity of the read/write head in the radial direction, so that each spiral follows a predetermined spiral trajectory as accurately as practicable. In this way, the servo spirals are written with uniform spacing therebetween. However, during the iterative processes of spiral writing, the disk drive actuator for the read/write head can be exposed to various unpredictable disturbances, such as external vibrations or impacts, changes in the flex bias of a flexible circuit board coupled to the disk drive actuator, changes in the pivot friction within a pivot bearing of the actuator, and the like. Because such disturbances cannot always be adequately compensated for by the servo system of the disk drive, the actuator sometimes deviates from the target trajectory. As a result, spirals can be written with non-uniform spacing to a disk surface, and sometimes can even cross adjacent spirals. Such inaccurately positioned spirals in a disk drive can deleteriously affect the ability of the disk drive to correctly write servo sectors, or even prevent the disk drive from writing servo sectors at all, resulting in scrapping or reworking of the disk drive.

SUMMARY

One or more embodiments provide systems and methods for more accurately writing servo spirals during an SSW process in a disk drive. According to the embodiments, the effect of unpredictable disturbances on the writing of a servo spiral is ameliorated by temporarily increasing the servo bandwidth (also referred to as "reducing the response time") of a servo controller of the disk drive. Thus, while a servo spiral is being written as part of an SSW process using a first set of controller parameter values for the servo controller, when a positional disturbance is detected that exceeds a threshold position-error value, the servo controller is configured with a second set of controller parameters. Specifically, the second set of controller parameters are selected to increase the bandwidth (i.e., reduce the response time) of the servo controller. As a result, the servo controller reduces the magnitude of and more quickly recovers from the effects of the disturbance. For example, when the servo controller includes a proportional-integral-derivative (PID) control scheme, the second set of controller parameter values may include an increased proportional gain relative to that of the first set of controller parameter values. Consequently, the servo controller more quickly corrects the radial position of a write head than when configured with the first set of controller parameters.

According to an embodiment, a method for writing servo information in a disk drive that includes a write head and one or more recording surfaces includes: writing a first portion of a first spiral with the write head on a first recording surface of the one or more recording surfaces while controlling a radial position of the write head with a controller that is configured with a first set of controller parameter values; after the read head crosses a second spiral formed on a second recording surface of the one or more recording surfaces, determining a radial position error for the write head based on information associated with the second spiral; and in response to the radial position error exceeding a disturbance threshold value, writing a second portion of the first spiral with the write head while controlling the radial position of the write head with the controller while the controller is configured with a second set of controller parameter values.

A disk drive, according to an embodiment, includes: a write head, a read head, one or more recording surface, and a controller. The controller is configured to perform the steps of: writing a first portion of a first spiral with the write head on a first recording surface of the one or more recording surfaces while controlling a radial position of the write head with a controller that is configured with a first set of controller parameter values; after the read head crosses a second spiral formed on a second recording surface of the one or more recording surfaces, determining a radial position error for the write head based on information associated with the second spiral; and in response to the radial position error exceeding a disturbance threshold value, writing a second portion of the first spiral with the write head while controlling the radial position of the write head with the controller while the controller is configured with a second set of controller parameter values.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

System Overview

Figure 1:
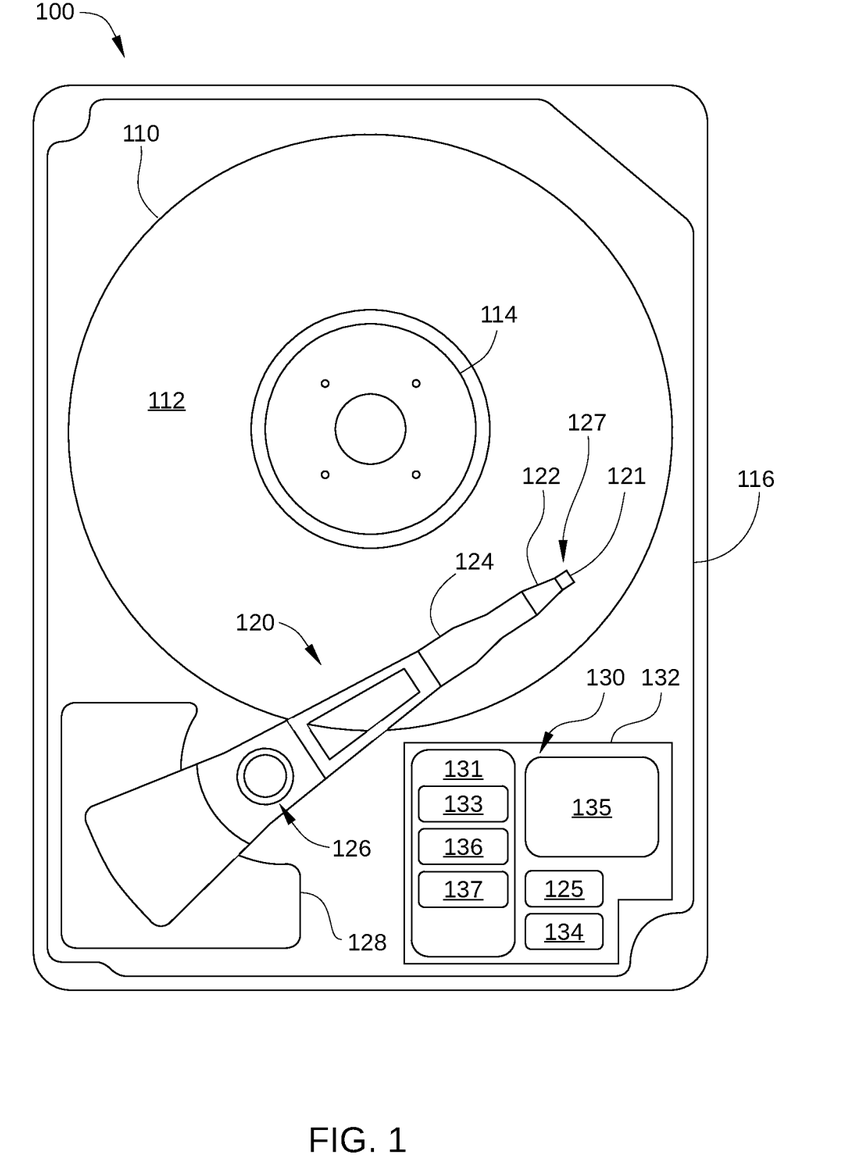
FIG. 1 is a schematic view of an exemplary hard disk drive, according to one embodiment.

FIG. 1 is a schematic view of an exemplary hard disk drive (HDD) 100, according to one embodiment. For clarity, HDD 100 is illustrated without a top cover. HDD 100 includes multiple storage disks 110 (only one of which is visible in FIG. 1) that each include one or two recording surfaces 112 on which a plurality of concentric data storage tracks are disposed. Storage disks 110 are coupled to and rotated by a spindle motor 114 that is mounted on a base plate 116. An actuator arm assembly 120 is also mounted on base plate 116, and includes one or more sliders 121 (only one of which is visible in FIG. 1), each mounted on a flexure arm 122 with a magnetic read/write head 127 that reads data from and writes data to the data storage tracks of an associated recording surface 112. Each flexure arm 122 is attached to an actuator arm 124 that rotates about a bearing assembly 126 by a voice coil motor 128. Thus, voice coil motor 128 moves all of the one or more sliders 121 radially relative to a respective recording surface 112 of a respective storage disk 110, thereby positioning a read/write head 127 over a desired concentric data storage track.

Spindle motor 114, read/write head 127, and voice coil motor 128 are coupled to electronic circuits 130, which are mounted on a printed circuit board 132. In some embodiments, each read/write head 127 has an associated additional actuator, such as a microactuator. The additional actuator (not shown in FIG. 1) could be on the suspension (i.e., flexure arm 122), at the gimbal between the suspension and slider 121, or on slider 121, and can move the associated read/write head 127 radially a small distance. Such actuators are generally referred to as dual-stage actuators, and enable the servo system of HDD 100 to attain more accurate tracking control.

In the embodiment illustrated in FIG. 1, a single actuator arm assembly 120 is shown that includes only one slider 121, one flexure arm 122, one actuator arm 124, and one read/write head 127. In other embodiments, actuator arm assembly 120 includes a plurality of actuator arms 124, sliders 121, flexure arms 122, and read/write heads 127, where each read/write head 127 is associated with a different recording surface 112 of HDD 100. Further, in some embodiments, HDD 100 can include multiple actuator arm assemblies 120 that are each rotated about bearing assembly 126 by a respective VCM 128 independently from each other. In such embodiments, each actuator arm assembly 120 may each include a plurality of actuator arms 123, sliders 121, flexure arms 122, and read/write heads 127.

Electronic circuits 130 include a read/write channel 137, a microprocessor-based controller 133, random-access memory (RAM) 134 (which may be a dynamic RAM and used as one or more data buffers) and/or a flash memory device 135, and, in some embodiments, a flash manager device 136. In some embodiments, read/write channel 137 and microprocessor-based controller 133 are included in a single chip, such as a system-on-chip 131. In some embodiments, HDD 100 further includes a motor-driver chip 125 that accepts commands from microprocessor-based controller 133 and drives both spindle motor 114 and voice coil motor 128. Read/write channel 137 communicates with the read/write head 127 via a preamplifier (not shown) that may be mounted on a flex-cable that is itself mounted on either base plate 116, actuator arm 120, or both.

When data are transferred to or from a particular storage disk 110 of HDD 100, actuator arm assembly 120 moves in an arc between the inner diameter (ID) and the outer diameter (OD) of a particular storage disk 110. Actuator arm assembly 120 accelerates in one angular direction when current is passed in one direction through the voice coil of voice coil motor 128 and accelerates in an opposite direction when such current is reversed, thereby allowing control of the position of actuator arm assembly 120 and the attached read/write head 127 with respect to the particular storage disk 110. Voice coil motor 128 is coupled with a servo system that uses the positioning data read from servo wedges on storage disk 110 by read/write head 127 to determine the position of read/write head 127 over a specific data storage track. For example, the servo system may position read/write head 127 over recording surface 112 based on positioning data read from recording surface 112.

In positioning a read/write head 127 over a recording surface 112, the servo system determines an appropriate current to drive through the voice coil of voice coil motor 128, and drives said current using a current driver and associated circuitry. Typically, the appropriate current is determined based in part on a position feedback signal of the read/write head 127, such as a position error signal (PES). The PES is typically generated by using servo patterns included in the servo wedges (not shown) on the recording surface 112 as a reference. One embodiment of a recording surface 112 is illustrated in FIG. 2.

Figure 2:
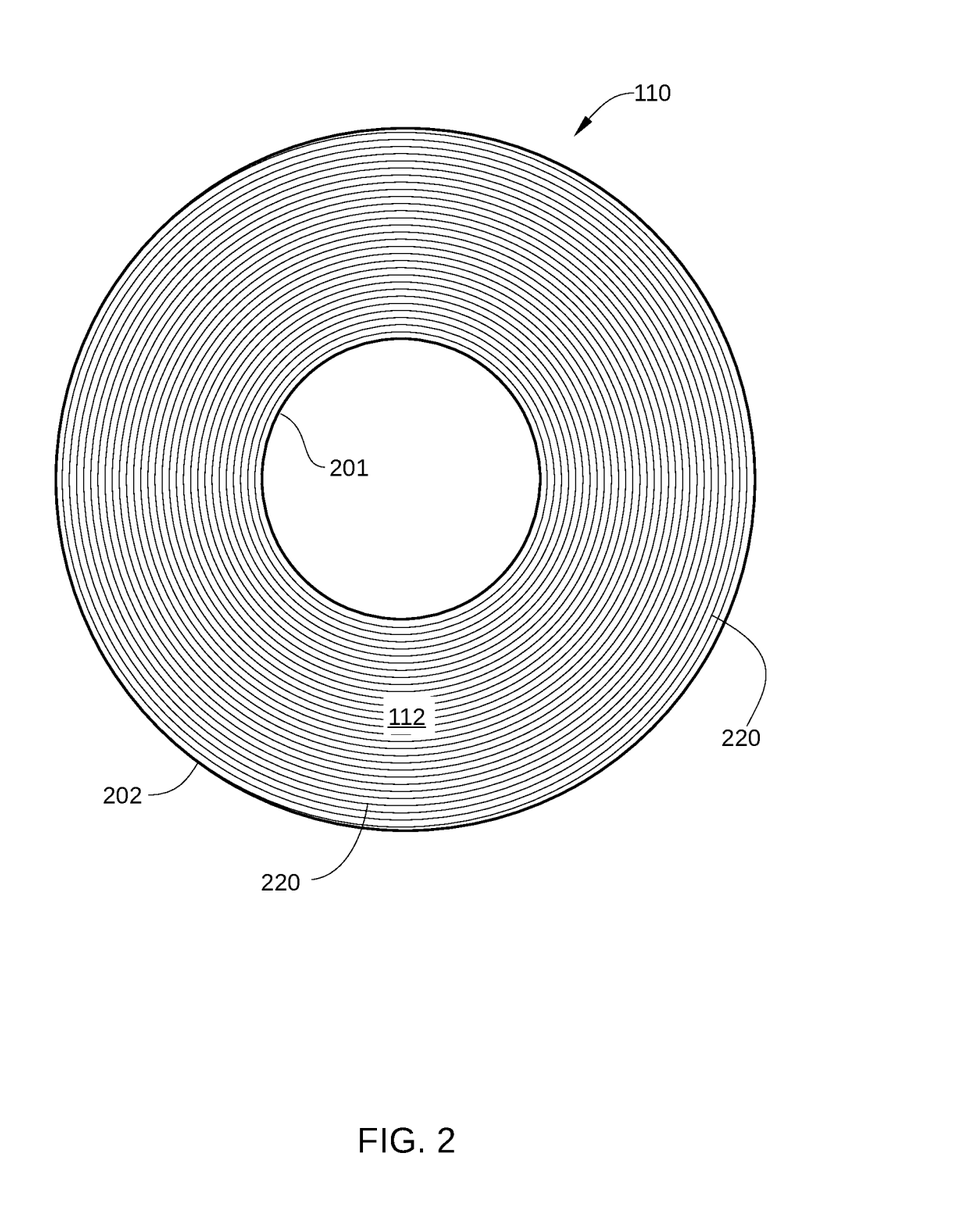
FIG. 2 schematically illustrates a recording surface of a storage disk with concentric data storage tracks formed thereon, according to an embodiment.

FIG. 2 schematically illustrates a recording surface 112 of a storage disk 110 with concentric data storage tracks 220 formed thereon, according to an embodiment. Data storage tracks 220 are formed on recording surface 112 between an ID 201 and an OD 202 of storage disk 110. Data storage tracks 220 are configured for storing data, and the radial position and track pitch, i.e., spacing, of data storage tracks 220 is defined by servo sectors (not shown) formed on recording surface 112. Each servo sector contains a reference signal that is read by read/write head 127 during read and write operations to position read/write head 127 above a desired data storage track 220. Typically, the actual number of data storage tracks 220 included on recording surface 112 is considerably larger than illustrated in FIG. 2. For example, recording surface 112 may include hundreds of thousands of concentric data storage tracks 220.

In order for HDD 100 to perform SSW and write the above-described servo wedges on storage disk 110 with the necessary precision for proper operation of HDD 100, position and timing information are provided to the disk drive servo system of HDD 100. The position and timing information that enable the internal servo system of HDD 100 to perform servo self-write (SSW) is typically in the form of reference spiral tracks or "servo spirals" written on storage disk 110. One embodiment of such servo spirals is illustrated in FIG. 3.

Figure 3:
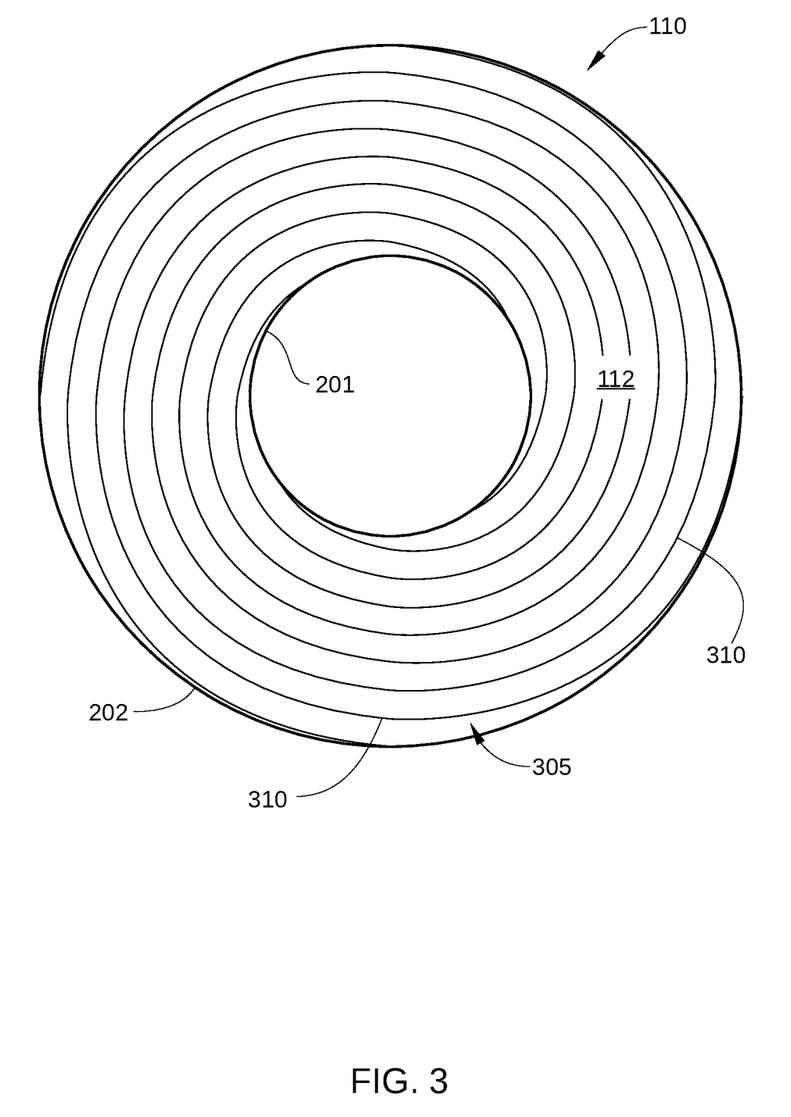
FIG. 3 illustrates storage disk prior to undergoing a SSW process, according to one embodiment.

FIG. 3 illustrates storage disk 110 prior to undergoing a SSW process, according to one embodiment. As shown, storage disk 110 has a spiral set 305 written thereon that includes a plurality of servo spirals 310 that are each circumferentially spaced from adjacent servo spirals 310. It is noted that the number of servo spirals 310 in spiral set 305 is generally larger than that shown in FIG. 3, for example as few as ten or twenty, or as many as several hundred.

Spiral set 305 may be any set of servo spirals configured to provide timing and position information for the servo system of HDD 100 to position a write head while writing another set of servo spirals. Thus, in some embodiments, spiral set 305 is a set of coarse, i.e., initial, servo spirals. In such embodiments, spiral set 305 may be written onto a substantially blank surface 112 of storage disk 110 without the aid of external equipment using read/write head 127 and the servo system of HDD 100, for example, via a bootstrap spiral-writing process. In such a process, references spirals 310 of spiral set 305 are written by read/write head 127 while actuator arm assembly 120 is moved across surface 112 either by applying a suitable open loop voltage or current profile, or by using velocity control based on back EMF feedback. Alternatively, in some embodiments spiral set 305 is a set of fine servo spirals, i.e., servo spirals that are more accurately positioned than coarse servo spirals. In such embodiments, spiral set 305 is written onto surface 112 after surface 112 has another set of the above-described coarse spirals written thereon (not shown for clarity). In such embodiments, servo spirals 310 are typically written onto surface 112 using closed-loop tracking of the previously written coarse servo spirals, and can be used subsequently for writing a more accurately positioned set of servo spirals, such as final servo spirals, that enable the writing of servo sector information on surface 112 by HDD 100 in an SSW process. Thus, servo spirals 310 enable the generation of a set of more accurately positioned servo spirals or the writing of final servo sector information on surface 112 using closed-loop control in the servo system of HDD 100.

Ideal Servo Spirals vs. Actual Servo Spirals

Ideally, during a spiral-based SSW process, servo spirals are written by moving a write head with a constant radial velocity relative to the disk surface on which the servo spirals are being written. In this way, a uniform circumferential spacing is maintained between the servo spirals in a set of spirals on a disk surface. As a result, using the set of uniformly spaced spirals, a servo system of a disk drive can precisely determine the radial position of a write head while the write head writes a different set of spirals. A portion of a set of ideal servo spirals is described below in conjunction with FIG. 4.

Figure 4:
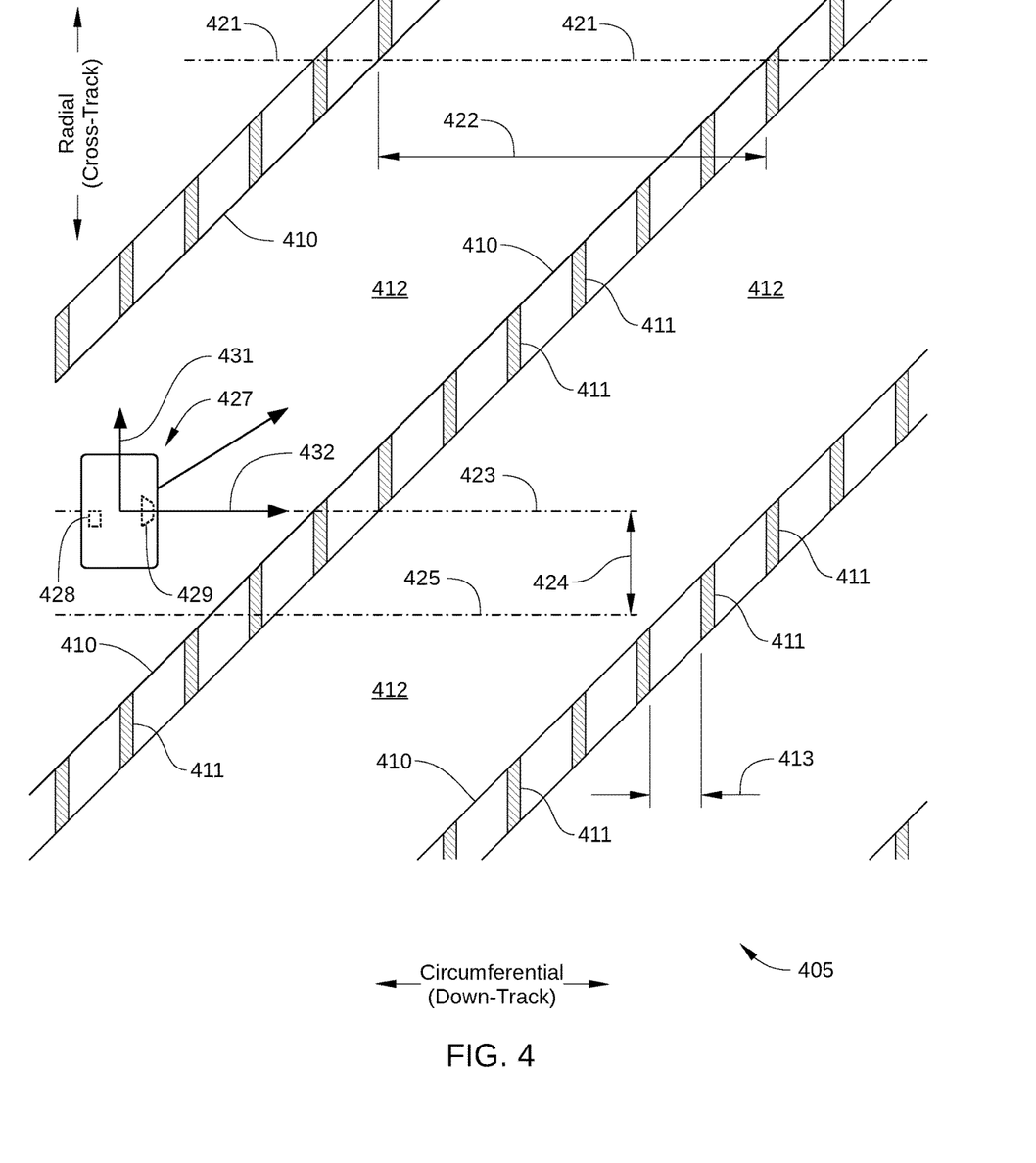
FIG. 4 schematically illustrates a portion of a spiral set of ideally written servo spirals, according to various embodiments.

FIG. 4 schematically illustrates a portion of a spiral set 405 of ideally written servo spirals 410, according to various embodiments. Each ideally written servo spiral 410 is formed or written as a pattern on a recording surface 412 of an HDD, which can be consistent with recording surface 112 of FIGS. 1-3. Spiral set 405 can be any set of servo spirals configured to provide timing and position information for the servo system of the HDD to position a write head while writing another set of servo spirals.

As shown, each ideally written servo spiral 410 extends across recording surface 412 in a radial (cross-track) direction and a circumferential (down-track) direction, and therefore appears as a diagonal line relative to the radial and circumferential directions. Further, each of ideally written servo spirals 410 is separated at any particular radial location 421 from adjacent ideally written spirals by a uniform circumferential spacing 422.

Also shown in FIG. 4 is a read/write head 427, which includes a read element 428 (sometimes referred to as a "read head") and a write element 429 (sometimes referred to as a "write head"). Rotation of recording surface 412 results in motion 432 of read/write head 427 in the circumferential direction relative to recording surface 412, and radial actuation of an actuator for read/write head 427 results in motion 431 of read/write head 427 in the radial direction relative to recording surface 412. Ideally written servo spirals 410 each include sync marks 411, which are separated circumferentially from adjacent sync marks 411 by a constant timing interval 413. Therefore, as read/write head 427 passes over a servo spiral 410, sync marks 411 included in each ideally written servo spiral 410 are read by read element 428 and thereby provide timing information to the servo system of the HDD. Further, using techniques well-known in the art, the timing information provided by sync marks 411 and an estimated slope of ideally written servo spirals 410 enables the determination of a current radial position 423 of read/write head 427 relative to recording surface 412. A PES 424 of read/write head 427 can then be determined based on current radial position 423 of read/write head 427.

Typically, PES 424 of read/write head 427 is a difference between current radial position 423 of read/write head 427 and a target position 425 of read/write head 427. In an SSW process, read/write head 427 writes a new servo spiral (not shown) that is included in a different set of servo spirals than spiral set 405. A target trajectory of the new servo spiral is an ideal trajectory for the new servo spiral, and is parallel with adjacent servo spirals in the same set of servo spirals. In practice, the accuracy of the positioning of the new servo spiral is affected by the magnitude of PES 424. For example, the actuator for the read/write head 427 can be exposed to various unpredictable disturbances while the new servo spiral is being written, such as external vibrations or impacts, changes in the flex bias of a flexible circuit board coupled to the actuator, changes in the pivot friction within a pivot bearing of the actuator, and the like. As a result, even when servoing off of accurately written servo spirals like ideally written servo spirals 410, PES 424 can be excessive, meaning that read/write head 427 deviates significantly from the target trajectory for the new servo spiral. Thus, such disturbances can cause the new servo spiral that is currently being written by read/write head 427 to be inaccurately positioned on recording surface 412, as shown in FIG. 5.

Figure 5:
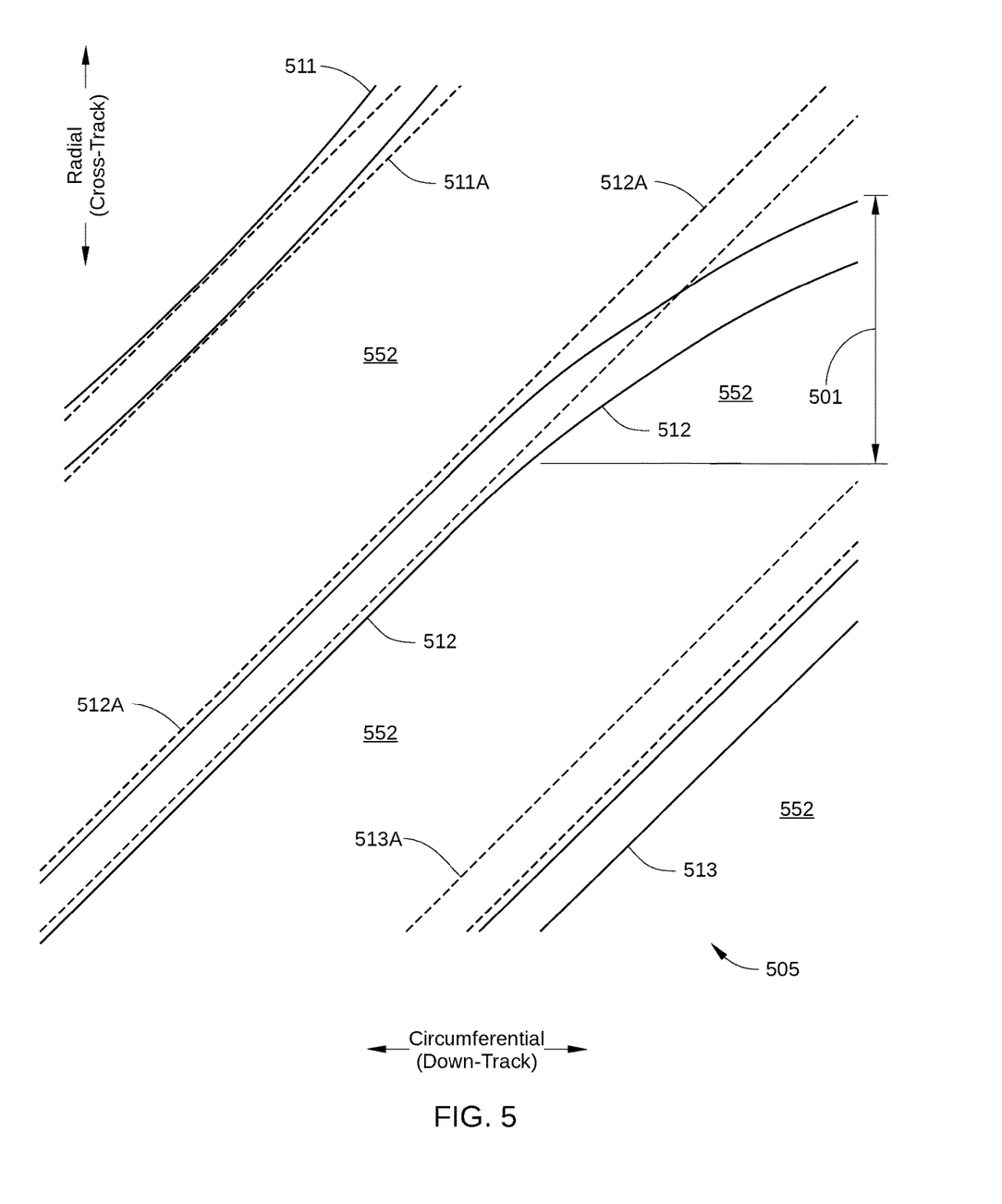
FIG. 5 schematically illustrates a portion of a spiral set of servo spirals written during unpredictable disturbances, according to various embodiments.

FIG. 5 schematically illustrates a portion of a spiral set 505 of servo spirals written during unpredictable disturbances, according to various embodiments. Each of the servo spirals in spiral set 505 is formed on or written as a pattern on a recording surface 552 of an HDD, which can be consistent with recording surface 112 of FIGS. 1-3. Spiral set 505 can be any set of servo spirals that are written while the servo system of the HDD positions a write head while determining timing and position information from another set of servo spirals (not shown), such as spiral set 405 in FIG. 4.

In the instance illustrated in FIG. 5, spiral set 505 includes a first servo spiral 511, a second servo spiral 512, and a third servo spiral 513. Also shown in FIG. 5 is a target trajectory (dashed lines) for each of first servo spiral 511, second servo spiral 512, and third servo spiral 513, where target trajectory 511A corresponds to first servo spiral 511, target trajectory 512A corresponds to second servo spiral 512, and target trajectory 513A corresponds to third servo spiral 513. As shown, first servo spiral 511 closely follows associated target trajectory 511A and third servo spiral 513 closely follows associated target trajectory 513A. By contrast, the portion of second servo spiral 512 illustrated in FIG. 5 deviates significantly from associated target trajectory 512A. For example, while a read/write head (not shown) writes second servo spiral 512 and moves through radial locations 501, an unpredictable disturbance occurs, causing significant PES of the read/write head while moving radially through radial locations 501. The resultant deviation of second servo spiral 512 from target trajectory 512A causes second servo spiral 512 to be written as shown. According to various embodiments, such deviations of a servo spiral from a target trajectory can be reduced by reconfiguring the servo system of the HDD to have a higher bandwidth (shorter response time) when a PES disturbance is detected. As a result, the servo system reduces the magnitude of the PES disturbance and recovers more quickly from the effects of the disturbance.

Figure 6:
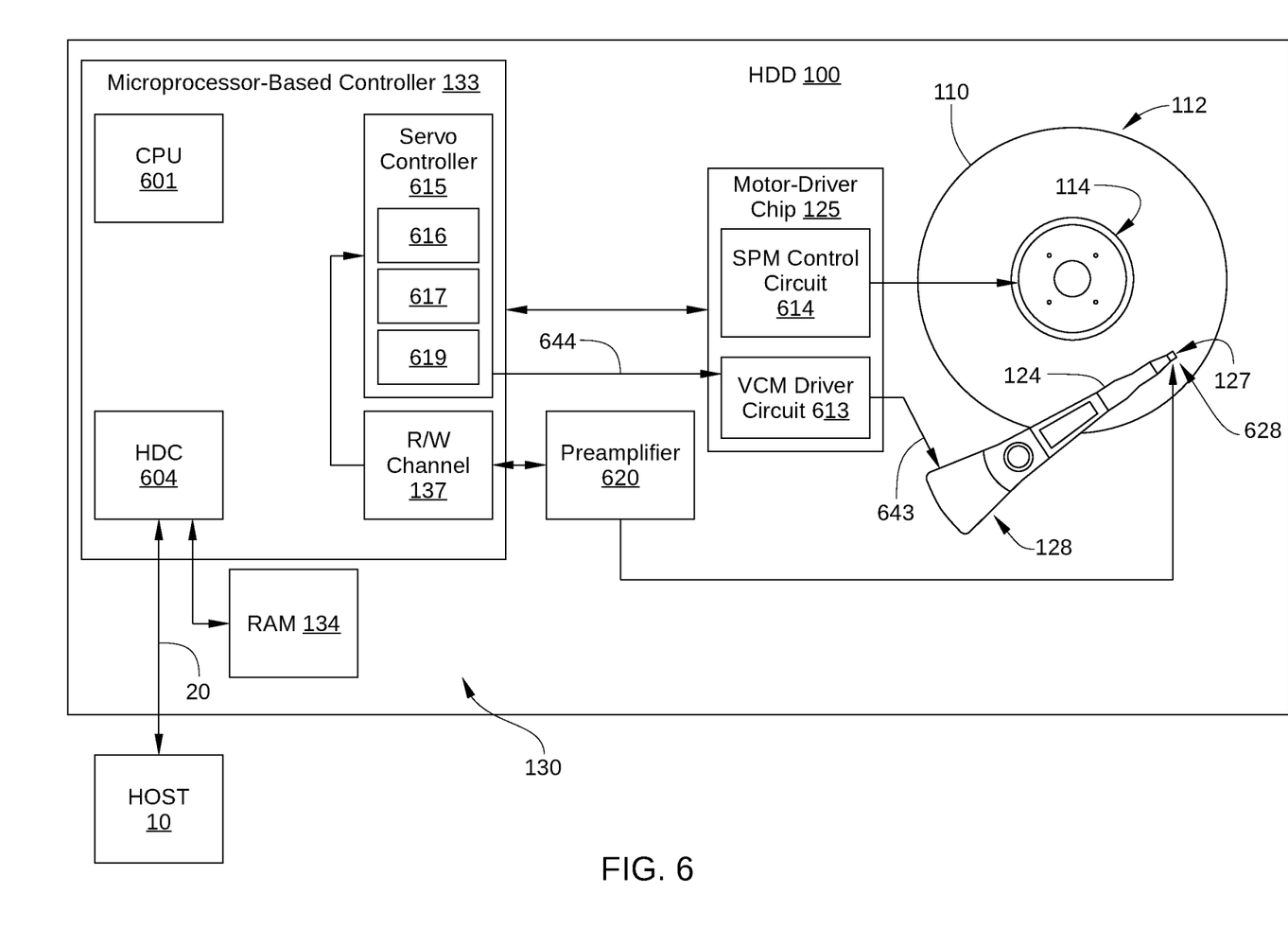
FIG. 6 illustrates an operational diagram of the HDD of FIG. 1 configured to implement various embodiments.

FIG. 6 illustrates an operational diagram of HDD 100 configured to implement various embodiments. In the embodiment illustrated in FIG. 6, a specific configuration of certain elements of electronic circuits 130 is described. In other embodiments, any other suitable arrangement or configuration of electronic circuits 130 may be employed that is operable to implement one or more embodiments described herein. For example, in some embodiments, various elements of microprocessor-based controller 133 may be configured in a single SoC and/or implemented as stand-alone chips included in electronic circuits 130.

HDD 100 is connected to a host 10, such as a host computer, via a host interface 20, such as a serial advanced technology attachment (SATA) bus or a Serial Attached Small Computer System Interface (SAS) bus. As shown, electronic circuits 130 of HDD 100 include microprocessor-based controller 133 and motor driver chip 125 communicatively coupled to microprocessor-based controller 133.

In the embodiment illustrated in FIG. 6, microprocessor-based controller 133 includes one or more central processing units (CPUs) 601 or other processors, a servo controller 615, a hard disk controller (HDC) 604, and read/write channel 137. Motor-driver chip 125 includes a VCM driver circuit 613 and a spindle motor (SPM) control circuit 614. VCM driver circuit 613 generates an amplified control signal 643 in response to control signals 644 (such as VCM commands) output from servo controller 615. Control signals 644 and amplified control signals 643 enable execution of disk access commands received from host 10 that are to be executed by a servo system of HDD 100 that includes VCM 128. Motor-driver chip 125 may also contain microactuator driver circuitry (not shown), which can drive microactuators, as described earlier.

In the embodiment illustrated in FIG. 6, HDD 100 includes a single RAM 134 that is external to microprocessor-based controller 133. In other embodiments, HDD 100 may include any other suitable configuration of RAM 134, such as a DRAM device integrated in microprocessor-based controller 133.

HDD 100 further includes a preamplifier 620 associated with read/write head 127. Preamplifier 620 can be mounted on actuator arm assembly 120 or elsewhere within the head and disk assembly (HDA) of HDD 100. Preamplifier 620 amplifies a read signal output from read sensor 201 and transmits the amplified read signal to read/write channel 137. In addition, preamplifier 620 supplies a write signal (e.g., current) to write head 203 in response to write data input from read/write channel 137.

CPU 601 controls HDD 100, for example according to firmware stored in flash memory device 135 (shown in FIG. 1) or another nonvolatile memory, such as portions of recording surfaces 112. For example, CPU 601 manages various processes performed by HDC 604, read/write channel 137, recording surfaces 112, and/or motor-driver chip 125. Such processes include a writing process for writing data onto recording surfaces 112, a reading process for reading data from recording surfaces 112, various calibration processes, a self-servo-writing process, and the like.

Read/write channel 137 is a signal processing circuits that decodes read signals transmitted from preamplifier 620 into read data that are outputted to HDC 604. In addition, read/write channel 137 encodes write data input from HDC 604 and outputs the encoded write data to preamplifier 620. In some embodiments, HDC 604 controls access to RAM 134 by CPU 601 and read/write channel 137, and receives/transmits data from/to host 10. In some embodiments, HDC 604 receives/transmits data from/to host 10 via interface 20.

In some embodiments, a servo system of HDD 100 (e.g., CPU 601, read/write channel 137, preamplifier 620, servo controller 615, voice-coil motor 128, and a suitable microactuator 628) performs positioning of read/write head 127 included in actuator arm assembly 120 over a corresponding recording surface 112, during which servo controller 615 determines an appropriate current to drive through the voice coil of VCM 128. Typically, the appropriate current is determined based in part on a position feedback signal of read/write head 127, such as PES.

Servo controller 615 receives positioning information from read/write channel 137 and determines a PES for read/write head 127 based on the received positioning information and on a target position of read/write head 127. Servo controller 615 then generates control signals 644 based on the PES. According to various embodiments, servo controller 615 includes a first set of control parameter values 616, a second set of control parameter values 617, and a disturbance recovery module 619.

First set of controller parameter values 616 includes values for the control parameters of servo controller 615 that are selected for writing smooth servo spirals. As such, when servo controller 615 is configured with the values included in first set of controller parameter values, servo controller 615 has a relatively low servo bandwidth, and therefore responds slowly and smoothly to PES disturbances for read/write head 127. However, when servo controller 615 is configured with the values included in first set of controller parameter values, servo controller 615 also responds relatively slowly to unpredictable disturbances to the radial position of read/write head 127. Consequently, the effects of such disturbances on the accuracy of a servo spiral being written can have excessive magnitude and duration, and a servo spiral that inaccurately follows the associated target trajectory may result, such as servo spiral 512 in FIG. 5.

By contrast, second set of controller parameter values 617 includes values for the control parameters of servo controller 615 that are selected for responding quickly to a disturbance in the PES of read/write head 127. As such, when servo controller 615 is configured with the values included in second set of controller parameter values, servo controller 615 has a relatively high servo bandwidth, and therefore responds quickly to PES disturbances for read/write head 127. Such a higher servo bandwidth is generally not desirable for a servo controller for writing an entire servo spiral, since the actual trajectory of the servo spiral written by a servo controller configured to operate with such higher servo bandwidth typically includes significant noise, such as higher-frequency variation (or "jitter") that is caused by the higher-frequency response of the servo controller. However, when servo controller 615 is configured to operate with such higher servo bandwidth in response to a large disturbance in PES being detected, the magnitude and duration of the disturbance can be reduced significantly when compared to the disturbance recovery that is possible when servo controller 615 is configured to operate with the lower servo bandwidth typically employed for servo spiral writing.

In some embodiments, servo controller 615 includes a proportional-integral-derivative (PID) control controller. In such embodiments, second set of controller parameter values 617 includes a proportional gain value that is larger than a corresponding proportional gain value in first set of controller parameter values 616. Alternatively or additionally, in such embodiments, second set of controller parameter values 617 includes an integral gain value that is larger than a corresponding integral gain value in first set of controller parameter values 616. Alternatively or additionally, in such embodiments, second set of controller parameter values 617 includes a derivative gain value that is larger than a corresponding derivative gain value in first set of controller parameter values 616.

In some embodiments, servo controller 615 includes a state space or other type of controller. In such embodiments, second set of controller parameter values 617 includes suitable values relative to corresponding values in first set of controller parameter values 616 that result in servo controller 615 having higher servo bandwidth than when in servo controller 615 is configured with first set of controller parameter values 616.

Disturbance module 619 is configured to detect when a PES for a write head exceeds a disturbance threshold value and, in response, to configure servo controller 615 with second set of controller parameter values 617. Thus, when disturbance module 619 determines that a particular disturbance in the radial position of the write head has occurred, the operation of servo controller 615 is modified to have a higher bandwidth, and therefore servo controller 615 can respond more quickly to the detected disturbance. Consequently, in some embodiments, the disturbance threshold value corresponds to an allowable radial disturbance in the radial position of the write head that can be tolerated while the controller is configured with the first set of controller parameter values.

In some embodiments, the disturbance threshold value is a constant value, such as a radial distance equivalent to a specific number of data storage tracks (e.g., 80 tracks, 100 tracks, etc.). In such embodiments, the disturbance threshold value can be a constant value for all radial locations from an ID to an OD of a particular storage disk. In other embodiments, the disturbance threshold value can vary depending on the current radial location of the write head. For example, in some embodiments, the disturbance threshold value is based on an ideal circumferential distance between servo spirals that are currently providing timing and position information to servo controller 615, such as uniform circumferential spacing 422 between ideally written servo spirals 410 (shown in FIG. 4). In such embodiments, the disturbance threshold value can be a specific fraction of the ideal circumferential distance, such as one half, one third, two thirds, etc. Because the ideal circumferential distance between servo spirals increases as the radial position from the ID of a storage disk increases, in such embodiments, the disturbance threshold value varies depending on the current radial location of the write head.

In some embodiments, disturbance module 619 is further configured to detect when a particular disturbance has ended and resume normal operation of servo controller 615. For example, in such embodiments, disturbance module 619 can be configured to determine, after a particular disturbance in the radial position of the write head has occurred, when the PES for the write head is less than a recovery threshold value. In such embodiments, in response to detecting that the PES for the write head is less than the recovery threshold value, disturbance module 619 reconfigures servo controller 615 with first set of controller parameter values 616. Thus, when disturbance module 619 determines that the particular disturbance has ended, normal operation of servo controller 615 is resumed. In such embodiments, the recovery threshold value may be significantly less than the disturbance threshold value (e.g., 20 tracks vs. 80 tracks), so that normal operation of servo controller 615 begins after the PES of the write head has dropped to a relatively normal or near-normal magnitude. Consequently, after a particular disturbance has ended, the servo spiral being written by the write head typically resumes a smoother actual trajectory.

In some embodiments, after disturbance module 619 has detected that a particular disturbance in the radial position of the write head has occurred, disturbance module 619 is further configured to detect when a disturbance recovery time interval has elapsed and, in response, begin checking whether the particular disturbance has ended. In such embodiments, the disturbance recovery time interval establishes a minimum time after detection of a particular disturbance during which servo controller 615 is configured with second set of controller parameter values 617. Thus, in such embodiments, when a particular disturbance has occurred, servo controller 615 is configured to operate with higher bandwidth and remains so configured for at least the disturbance recovery time interval.

In some embodiments, the disturbance recovery time interval is selected based on an empirically determined duration of a typical disturbance for a particular configuration of HDD 100. For example, in such embodiments, the disturbance recovery time interval is different for different models of HDD 100. Additionally or alternatively, in some embodiments, the disturbance recovery time interval corresponds to or is tracked as a specific number of servo samples. In such embodiments, each such servo sample corresponds to the write head crossing one servo spiral. Thus, in such embodiments, the disturbance recovery time is a time interval measured as a number of servo spiral crossings (e.g., 30, 50, etc.) that occur before disturbance module 619 begins checking whether a particular disturbance has ended.

In the embodiment illustrated in FIG. 6, various links are shown between certain elements of HDD 100 for enablement of certain embodiments. In some embodiments, additional and/or alternative links between certain elements of HDD 100 may exist for operation of HDD 100, but are not shown for clarity and ease of description. Such additional and/or alternative links would be known to one of ordinary skill in the art.

Reconfiguring Servo Controller to Handle Unpredictable Disturbances

Figure 7:
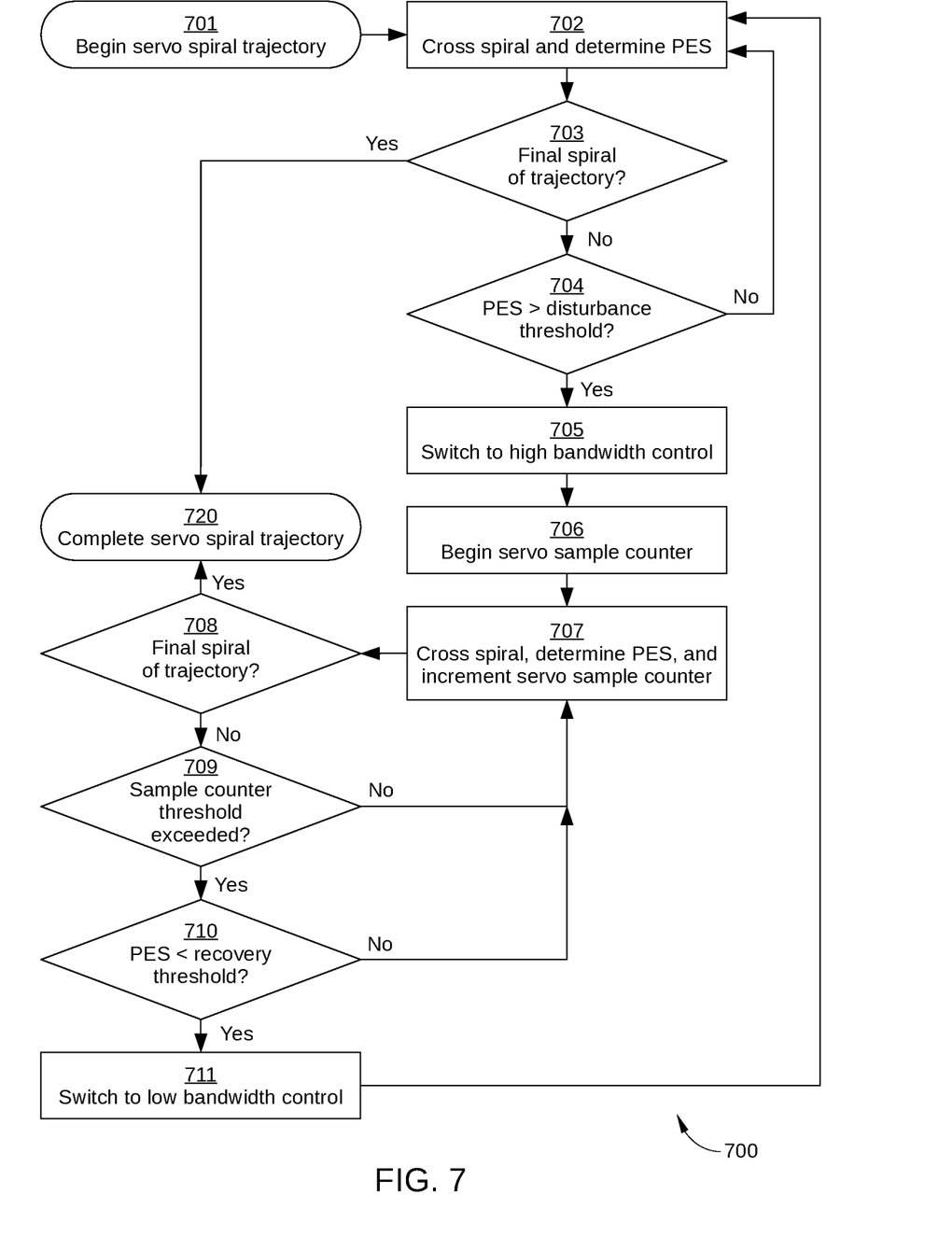
FIG. 7 sets forth a flowchart of method steps for writing servo information in a disk drive, according to various embodiments.

FIG. 7 sets forth a flowchart of method steps for writing servo information in a disk drive, according to various embodiments. The method steps may include one or more operations, functions, or actions as illustrated by one or more of blocks 701-720. Although the blocks are illustrated in a sequential order, these blocks may be performed in parallel, and/or in a different order than those described herein. Also, the various blocks may be combined into fewer blocks, divided into additional blocks, and/or eliminated based upon a specific implementation. Although the method steps are described in conjunction with HDD 100 of FIGS. 1-6, persons skilled in the art will understand that the method steps may be performed with other types of systems. The control algorithms for the method steps may reside in microprocessor-based controller 133, some other controller associated with HDD 100, servo controller 615, disturbance recovery module 619, or a combination thereof. The control algorithms can be implemented in whole or in part as software- or firmware-implemented logic, and/or as hardware-implemented logic circuits. Prior to the method steps, spiral set 305 is written or otherwise formed on storage disk 110 of HDD 100, for example as coarse guide spirals or fine guide spirals.

A method 700 begins at step 701, when a suitable controller (e.g., microprocessor-based controller 133, servo controller 615, and/or disturbance recovery module 619) begins moving a write head, such as read/write head 127, along a spiral trajectory and writing a new servo spiral. In step 701, servo controller 615 is configured with first set of control parameter values 616, and therefore servo controller 615 operates normally. As noted above, radial position information is provided to servo controller 615 via an existing spiral set, such as spiral set 305, so that the radial position of read/write head 127 can be controlled to follow a target spiral trajectory.

In some embodiments, the new servo spiral is written on the same recording surface as the existing spiral set. In other embodiments, the new spiral is written on a different recording surface than the existing spiral set. For example, in embodiments in which HDD 100 includes multiple recording surfaces, the new servo spiral can be written on a first recording surface 112 of HDD 100, while the existing spiral set is formed on a second recording surface 112 of HDD 100. Thus, in such embodiments, the write head is included in a read/write head 127 that is associated with the first recording surface 112 and the read head is included in a read/write head 127 that is associated with the second recording surface 112. Further, in such embodiments, the radial position of the write head is determined based on signals generated by the read head, where such signals are generated from the existing spiral set formed on the second recording surface. In such embodiments, the new servo spiral does not overwrite portions of the existing spiral set, since the new servo spiral is written to a different recording surface than the recording surface on which the existing spiral set is formed.

In step 702, read/write head 127 crosses a servo spiral included in spiral set 305. A read head included in read/write head 127 generates a signal that enables servo controller 615 to determine the current radial location of the write head included in a read/write head 127. As noted in step 701, in some embodiments, the write head is included in a different read/write head 127 than the read head. Servo controller 615 then determines a PES of the read/write head 127 that includes the write head (referred to herein as "the PES of read/write head 127") based on the current radial location of the read/write head 127 that includes the read head and on a target position 425 of the read/write head 127 that includes the read head.

In step 703, the controller determines whether the servo spiral crossed in step 702 is the final servo spiral of the current spiral trajectory. If yes, method 700 proceeds to step 720 and the servo trajectory is completed while servo controller 615 is configured with the first set of controller parameter values; if no, method 700 proceeds to step 704.

In step 704, the controller (e.g., disturbance recovery module 619) determines whether the PES of read/write head 127 exceeds the disturbance threshold value. Thus, in step 704, the controller determines whether an unpredictable disturbance has occurred. In some embodiments, the disturbance threshold value may vary based on the current radial location of read/write head. When the PES of read/write head 127 exceeds the disturbance threshold value, method 700 proceeds to step 705; when the PES is less than or equal to the disturbance threshold value, method 700 returns to step 702 and servo controller 615 continues to operate normally.

In step 705, the controller (e.g., disturbance recovery module 619) switches servo controller 615 to high-bandwidth control. Thus, in step 705 servo controller 615 is configured to operate with second set of controller parameter values 617 instead of first set of control parameter values 616.

In step 706, the controller (e.g., disturbance recovery module 619) begins a servo sample counter or other timing mechanism. In step 707, the read/write head 127 that includes the read head crosses the next servo spiral in spiral set 305. In response to crossing the next servo spiral, the controller (e.g., disturbance recovery module 619) determines the PES of read/write head 127 and increments the servo sample counter. Alternatively, the controller determines an elapsed time since the unpredictable disturbance detected in step 704 has occurred.

In step 708, the controller (e.g., disturbance recovery module 619) determines whether the final spiral of the current spiral trajectory has been crossed. If yes, method 700 proceeds to step 720 and the current servo spiral trajectory is completed while servo controller 615 is configured with the second set of controller parameter values; if no, method 700 proceeds to step 709.

In step 709, the controller (e.g., disturbance recovery module 619) determines whether a sample counter threshold value for the sample counter has been exceeded. That is, the controller determines whether the specified disturbance recovery time interval has elapsed. Alternatively, the controller determines whether an elapsed time since the unpredictable disturbance occurred exceeds a specified disturbance recovery time interval. In either case, if no, method 700 returns to step 707, and servo controller 615 remains configured with the second set of controller parameter values; if yes, method 700 proceeds to step 710.

In step 710, the controller (e.g., disturbance recovery module 619) determines whether the PES of read/write head 127 determined in step 706 is less than a recovery threshold value. If no, method 700 returns to step 707, and servo controller 615 remains configured with the second set of controller parameter values; if yes, method 700 proceeds to step 711. In step 711, the controller (e.g., disturbance recovery module 619) switches servo controller 615 to low-bandwidth control. Thus, in step 711 servo controller 615 is configured to operate with first set of controller parameter values 616 instead of second set of control parameter values 617. Method 700 then returns to step 702 and the current spiral trajectory continues.

Implementation of method 700 during the writing of servo information to a recording surface (e.g., servo spirals) improves the quality of the written servo information. As a result, the yield of HDDs manufactured using method 700 is increased. These technical advantages provide one or more technological advancements over prior art approaches.

While the foregoing is directed to embodiments of the present invention, other and further embodiments of the invention may be devised without departing from the basic scope thereof, and the scope thereof is determined by the claims that follow.

We claim:

1. A method of writing servo information in a disk drive that includes a write head, a read head, and one or more recording surfaces, the method comprising:
    writing a first portion of a first spiral with the write head on a first recording surface of the one or more recording surfaces while controlling a radial position of the write head with a controller that is configured with a first set of controller parameter values;
    after the read head crosses a second spiral formed on a second recording surface of the one or more recording surfaces, determining a radial position error for the write head based on information associated with the second spiral; and
    in response to the radial position error exceeding a disturbance threshold value, writing a second portion of the first spiral with the write head while controlling the radial position of the write head with the controller while the controller is configured with a second set of controller parameter values.

2. The method of claim 1, wherein controlling the radial position of the write head comprises generating signals, with the read head, from servo spirals on the second recording surface.

3. The method of claim 2, wherein the first recording surface is a different recording surface than the second recording surface.

4. The method of claim 3, wherein the first recording surface and the second recording surface are the same recording surface of the one or more recording surfaces.

5. The method of claim 1, wherein the disturbance threshold value is based on an ideal circumferential separation between the second spiral and a third spiral that is adjacent to the second spiral.

6. The method of claim 5, wherein the third spiral is included in a set of servo spirals that includes the second spiral and does not include the first servo spiral.

7. The method of claim 1, wherein the disturbance threshold value is an allowable radial disturbance for controlling the radial position of the write head with the controller while the controller is configured with the first set of controller parameter values.

8. The method of claim 1, further comprising, while writing the second portion of the first spiral with the write head and after the write head crosses a third spiral formed on the recording surface:
    determining a radial position error for the write head based on information associated with the third spiral; and
    in response to the radial position error based on information associated with the third spiral being less than a recovery threshold value, writing a third portion of the first spiral with the write head while controlling the radial position of the write head with the controller while the controller is configured with the first set of controller parameter values.

9. The method of claim 8, further comprising, prior to writing the third portion of the first spiral with the write head while the controller is configured with the first set of controller parameter values, determining that a disturbance recovery time interval has elapsed since the write head has crossed the second spiral.

10. The method of claim 9, wherein the disturbance recovery time interval comprises a time interval associated with a duration of a typical disturbance in the radial position of the write head.

11. The method of claim 9, wherein the disturbance recovery time interval corresponds to a number of spirals associated with a duration of a typical disturbance in the radial position of the write head.

12. The method of claim 1, wherein the controller has a higher servo bandwidth when the controller is configured with the second set of controller parameter values than when the controller is configured with the first set of controller parameter values.

13. A disk drive, comprising:
    a write head;
    a read head;
    one or more recording surfaces; and
    a controller configured to perform the steps of:
        writing a first portion of a first spiral with the write head on a first recording surface of the one or more recording surfaces while controlling a radial position of the write head with a controller that is configured with a first set of controller parameter values;
        after the read head crosses a second spiral formed on a second recording surface of the one or more recording surfaces, determining a radial position error for the write head based on information associated with the second spiral; and
        in response to the radial position error exceeding a disturbance threshold value, writing a second portion of the first spiral with the write head while controlling the radial position of the write head with the controller while the controller is configured with a second set of controller parameter values.

14. The disk drive of claim 13, wherein the read head generates signals for determining the radial position error for the write head.

15. The disk drive of claim 13, wherein the first spiral is included in a first set of servo spirals that enables controlling radial positioning of the write head relative to the first recording surface and the second spiral is included in a second set of spirals that enables controlling radial positioning of the write head relative to the second recording surface.

16. The disk drive of claim 13, wherein the information associated with the second spiral comprises at least one sync mark included in the second spiral.

17. The disk drive of claim 16, wherein determining the radial position error based on the information associated with the second spiral comprises determining a radial position of the write head based on the at least one sync mark.

18. The disk drive of claim 13, wherein the disturbance threshold value is based on an ideal circumferential separation between the second spiral and a third spiral that is adjacent to the second spiral.

19. The disk drive of claim 13, wherein the disturbance threshold value is an allowable radial disturbance for controlling the radial position of the write head with the controller while the controller is configured with the first set of controller parameter values.

20. The disk drive of claim 13, wherein the controller has a higher servo bandwidth when the controller is configured with the second set of controller parameter values than when the controller is configured with the first set of controller parameter values.

* * * * *